United States Patent Office.

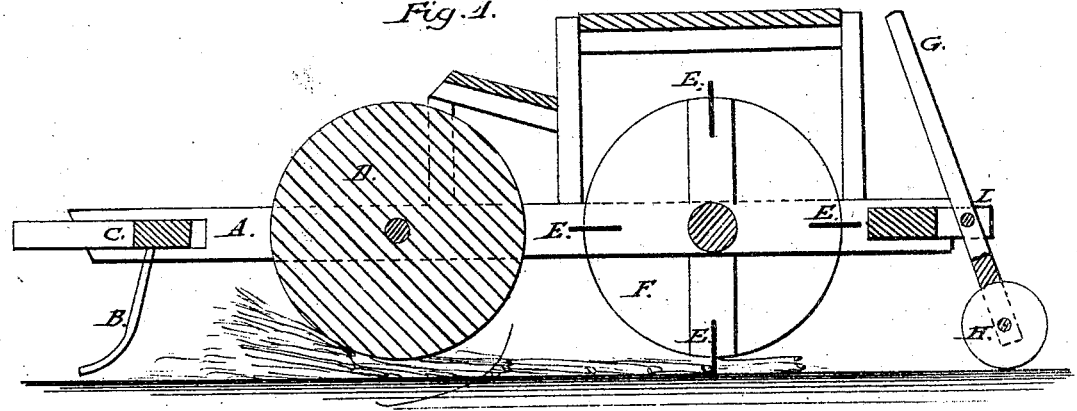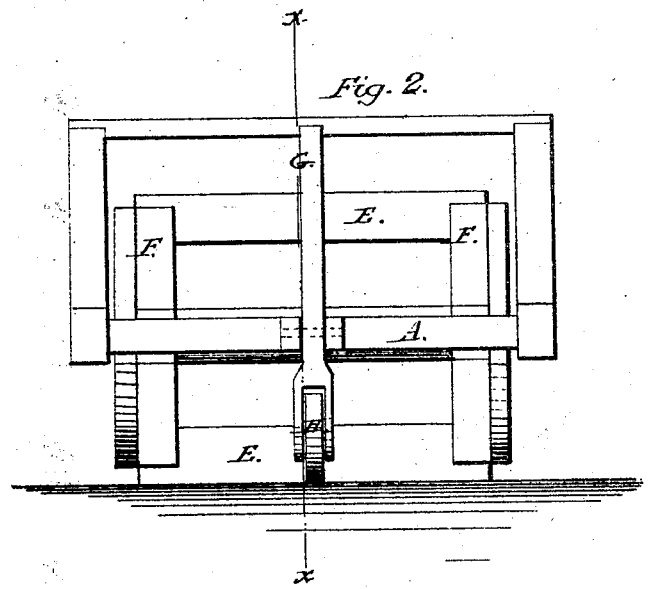

R. A. BOULWARE, OF DONIPHAN, KANSAS.

Letters Patent No. 96,079, dated October 26, 1869.

---

IMPROVEMENT IN STALK-CUTTERS.

---

The Schedule referred to in these Letters Patent and making part of the same.

---

To all whom it may concern:

Be it known that I, R. A. BOULWARE, of Doniphan, in the county of Doniphan, and State of Kansas, have invented a new and improved Stalk-Cutter; and I do hereby declare that the following is a full, clear, and exact description thereof, which will enable others skilled in the art to make and use the same, reference being had to the accompanying drawing, forming part of this specification.

The present invention relates to a new and useful device for cutting up the stalks of corn, &c., in the field, preparatory to plowing the same, the machine for this purpose having a crushing or breaking-roller in front, which is immediately followed by a series of knives, set in a revolving frame behind, which chops up the corn-stalks, and leaves them lying on the surface, the construction and operation of which will be understood from the following description.

Figure 1 represents a sectional elevation of my stalk-cutter, through the line x-x.

Figure 2 is a rear-end view of the same.

Similar letters of reference indicate corresponding parts.

In this case, the letter A represents the main frame of the machine, and B B represent two guide-rods attached to the tongue C, which serve to hold the stalks together, and guide the same under the drum or roller D, which serves to crush the stalks as it passes over them; and immediately following said roller, a series of knives or cutters, E, (four or more in number,) is set in a revolving frame, F, which will cut and chop up the stalks, and leave the same on the surface.

In order to protect the knives or rollers from being hurt on a rock or other obstruction in the field, a lever, G, provided with a roller or caster, H, is pivoted, at I, to the rear end of the frame A, thus enabling the machine to be raised sufficiently to clear the knives or cutters from such obstruction.

Having thus described my invention,

What I claim as new, and desire to secure by Letters Patent, is—

The arrangement of the revolving frame F, carrying the cutters E, the roller D, guide-rods B, and pivoted lever G, with its caster or roller H, as herein described, for the purpose specified.

R. A. BOULWARE.

Witnesses:
JOHN B. KENNEDY,
JOHN McNEMEE.